Patented Dec. 29, 1936

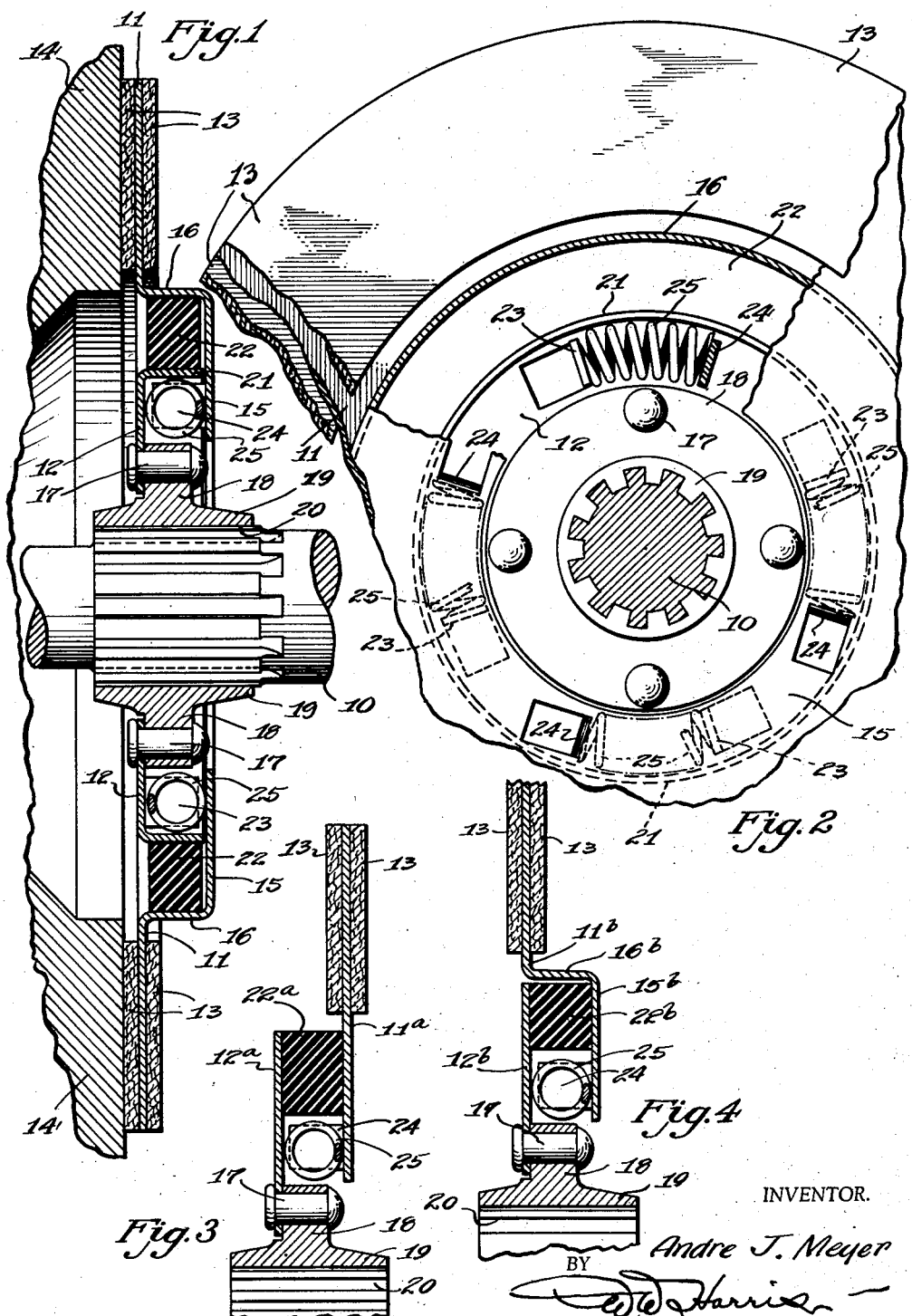

2,065,601

UNITED STATES PATENT OFFICE 2,065,601

DAMPING DEVICE

Andre J. Meyer, Detroit, Mich., assignor to Continental Motors Corporation, Detroit, Mich., a corporation of Virginia Application December 4, 1931, Serial No. 579,033

7 Claims. (Cl. 192—68)

This invention in its broader aspects relates to damping devices and refers more particularly to improved means for damping vibrations, noises, etc.

In its more limited aspects, my invention relates to improved damping devices incorporated in a clutch plate or disc of the type commonly used in automotive vehicle clutches wherein chatter and vibrations occur from the engine, transmission, and other parts of the vehicle assembly.

It is an object of my invention to provide improved damping means, more specifically an improved damping device adapted for use in clutches aforesaid.

A further object of my invention resides in the provision of an improved clutch plate which is highly effective in providing a yielding clutch engagement and in effectively damping said vibrations.

A further object of my invention resides in the provision of an improved damper structure adapted for assembly on a shaft, said damper having a hub structure secured to the shaft and an outer structure yieldingly connected thereto.

A still further object of my invention resides in the provision of a clutch plate having its parts yieldingly connected by mechanical spring means to permit their relative angular movement and internal friction means between said parts for opposing such relative movement, the internal friction means in the specific form of my invention consisting of a rubber member vulcanized to the relatively movable parts whereby wear of the rubber is avoided. Further, the rubber member by reason of my construction is placed in shear instead of compression thereby increasing the life of the rubber and adding to the efficiency of the device.

Further objects and advantages of my invention will be apparent as this specification progresses, reference being had to the accompanying drawing, in which:

Fig. 1 is a sectional view through the damper or clutch plate,

Fig. 2 is a fragmentary side elevation view of the clutch plate shown in Fig. 1, Fig. 3 is a fragmentary sectional elevation view of a modified form of my invention, and Fig. 4 is a like view of a still further modification.

In the drawing, in which like reference characters indicate corresponding parts, reference character 10 represents the shaft on which the clutch plate or damper is mounted, the latter comprising a disc structure or disc member 11 and a plate member 12. The disc member 11 is provided with the usual friction material or mats 13 engageable in the usual manner between driving parts such as flywheel 14 and the usual clutch pressure plate (not shown), said disc member and associated parts constituting inertia means of the damper.

The disc member is formed with a longitudinally offset portion 15 by reason of the cylindrical flange or shoulder 16 formed concentrically with the axis of shaft 10. The plate member 12 has its inner circumferential portion rigidly secured as by rivets 17 with the radially extending flange 18 of the hub structure 19, the latter being secured to shaft 10 as by splines 20. The plate member further has its outer circumferential portion deflected longitudinally to form the cylindrical flange 21 concentrically within and spaced from flange 16.

The space intermediate flanges 16 and 21 is filled by a ring or annulus 22 preferably of rubber or other yielding non-metallic material adapted to damp vibrations and oppose the relative angular displacement of the disc member 11 and the plate member 12 by reason of internal friction developed within the material. The rubber annulus 22 is preferably vulcanized to the flanges 16 and 21 whereby to prevent relative surface sliding movement between the rubber annulus 22 and members 11 and 12.

The plate member 12 and the offset portion 15 have cooperating pairs of circumferentially spaced spring seats 23, 24 respectively struck out from the plate member and offset portion toward each other. Intermediate the spring seats are coil springs 25 housed by the plate member 12 and offset portion 15. The springs are prevented from radial displacement inwardly from their proper position by the hub flange 18 and outwardly by the flange 21 in Figs. 1 and 2 or by the rubber annulus in the embodiment of Figs. 3 and 4. The springs 25 constitute mechanical yielding means primarily affording the drive from disc structure 11 to plate member 12 and shaft 10 and permitting relative angular displacement between these parts.

In Fig. 3 the disc structure 11ª and plate member 12ª are not flanged as in Figs. 1 and 4. In Fig. 3 the rubber annulus 22ª is vulcanized to and between the flat parallel faces of the disc structure 11ª and the plate member 12ª. The construction of the clutch plate in Fig. 3 is otherwise similar to Fig. 1.

In Fig. 4 the disc member 11ᵇ is formed with a longitudinally offset portion 15ᵇ by reason of the cylindrical flange or shoulder 16ᵇ formed concentrically with the axis of shaft 10. In this modified construction the rubber annulus 22ᵇ is vulcanized to and between the flat parallel faces of the offset portion 15ᵇ of the disc member 11ᵇ and the plate member 12ᵇ. The construction of the clutch plate structure in Fig. 4 is otherwise similar to Fig. 1.

It will be apparent to those skilled in the art to which my invention pertains that various modifications and changes may be made therein without departing from the spirit of my invention or from the scope of the appended claims.

What I claim as my invention is:

1. A clutch plate comprising a hub structure including a plate member, a disc member provided with friction material, said members having spring seats struck therefrom toward each other, and a spring intermediate said seats for permitting yielding relative angular displacement between said plate and disc members, and means loaded by shearing forces and developing internal friction upon relative displacement of said plate and disc members whereby to yieldingly oppose said displacement.

2. A clutch plate comprising a hub structure including a plate member, a disc member provided with friction material, said members having spring seats struck therefrom toward each other, and a spring intermediate said seats for permitting yielding relative angular displacement between said plate and disc members, and separate damping means loaded by shearing forces and yieldingly opposing said angular displacement.

3. A clutch plate comprising a hub structure including a plate member, a disc member provided with friction material, said members having spring seats struck therefrom toward each other, and a spring intermediate said seats for permitting yielding relative angular displacement between said plate and disc members, and means adapted to develop internal friction upon relative displacement of said plate and disc members whereby to damp said displacement, one of said members having a portion deflected longitudinally of the axis of the hub structure whereby to longitudinally overlie said internal friction means.

4. A clutch plate including a hub having a radially extending flange, a plate member rigidly secured to said flange and extending radially outwardly therefrom, a disc member having an outer portion provided with friction mats and also having an inner portion spaced from said plate member longitudinally of the axis of the hub member, a plurality of circumferentially spaced coil springs housed intermediate said plate member and said inner portion of the disc member, said hub flange cooperating with said springs to prevent their displacement inwardly from said housed position of said springs, said plate member and said inner portion of the disc member having circumferentially spaced cooperating spring seats struck therefrom longitudinally of the hub axis and toward each other for seating said springs whereby to yieldingly connect said plate member and said disc member.

5. A clutch plate including a hub having a radially extending flange, a plate member rigidly secured to said flange and extending radially outwardly therefrom, a disc member having an outer portion provided with friction mats and also having an inner portion spaced from said plate member longitudinally of the axis of the hub member, a plurality of circumferentially spaced coil springs housed intermediate said plate member and said inner portion of the disc member, said hub flange cooperating with said springs to prevent their displacement inwardly from said housed position of said springs, said plate member and said inner portion of the disc member having circumferentially spaced cooperating spring seats struck therefrom longitudinally of the hub axis and toward each other for seating said springs whereby to yieldingly connect said plate member and said disc member, and a rubber annulus substantially concentric with the hub axis and positioned intermediate said plate member and said disc member radially beyond said springs, said rubber annulus being secured to said disc member and said plate member against relative surface movement.

6. A clutch plate including a hub having a radially extending flange, a plate member rigidly secured to said flange and extending radially outwardly therefrom, a disc member having an outer portion provided with friction mats and also having an inner portion spaced from said plate member longitudinally of the axis of the hub member, a plurality of circumferentially spaced coil springs housed intermediate said plate member and said inner portion of the disc member, said hub flange cooperating with said springs to prevent their displacement inwardly from said housed position of said springs, said plate member and said inner portion of the disc member having circumferentially spaced cooperating spring seats struck therefrom longitudinally of the hub axis and toward each other for seating said springs whereby to yieldingly connect said plate member and said disc member, and a rubber annulus substantially concentric with the hub axis and positioned intermediate said plate member and said disc member radially beyond said springs, said rubber annulus being vulcanized to said disc member and said plate member.

7. A clutch plate including a hub having a radially extending flange, a plate member rigidly secured to said flange and extending radially outwardly therefrom, a disc member having an outer portion provided with friction mats and also having an inner portion spaced from said plate member longitudinally of the axis of the hub member, a plurality of circumferentially spaced coil springs housed intermediate said plate member and said inner portion of the disc member, said hub flange cooperating with said springs to prevent their displacement inwardly from said housed position of said springs, said plate member and said inner portion of the disc member having circumferentially spaced cooperating spring seats struck therefrom longitudinally of the hub axis and toward each other for seating said springs whereby to yieldingly connect said plate member and said disc member, and a rubber annulus substantially concentric with the hub axis and positioned intermediate said plate member and said disc member radially beyond said springs, said rubber annulus being vulcanized to said disc member and said plate member, said rubber annulus cooperating with said springs to prevent their displacement outwardly from said housed position of said springs.

ANDRE J. MEYER.